(12) United States Patent
Hwang et al.

(10) Patent No.: US 9,201,523 B1
(45) Date of Patent: Dec. 1, 2015

(54) SMART PEN

(71) Applicants: Joon Ung Hwang, Milpitas, CA (US);
Jimmy Duong, Milpitas, CA (US);
Congqin Miao, Milpitas, CA (US)

(72) Inventors: Joon Ung Hwang, Milpitas, CA (US);
Jimmy Duong, Milpitas, CA (US);
Congqin Miao, Milpitas, CA (US)

( * ) Notice: Subject to any disclaimer, the term of this patent is extended or adjusted under 35 U.S.C. 154(b) by 0 days.

(21) Appl. No.: 14/472,076

(22) Filed: Aug. 28, 2014

(51) Int. Cl.
*G06F 3/0354* (2013.01)

(52) U.S. Cl.
CPC ........ *G06F 3/03545* (2013.01); *G06F 3/03547* (2013.01)

(58) Field of Classification Search
CPC ............ G06F 3/03545; G06F 3/03547; G06F 3/03546; G06F 3/039; G06F 21/35
See application file for complete search history.

(56) References Cited

U.S. PATENT DOCUMENTS

| | | | |
|---|---|---|---|
| 6,956,564 B1 | 10/2005 | Williams | |
| 7,231,181 B2 | 6/2007 | Kohli et al. | |
| 2009/0213070 A1* | 8/2009 | Kalaldeh | G06F 3/0317 345/157 |
| 2013/0201162 A1 | 8/2013 | Cavilia | |
| 2015/0077351 A1* | 3/2015 | Lee | G06F 3/0433 345/173 |

* cited by examiner

*Primary Examiner* — Abbas Abdulselam
(74) *Attorney, Agent, or Firm* — Plager Schack LLP

(57) ABSTRACT

A smart pen is configured to communicate with a computer peripheral device. The smart pen includes an external assembly comprising a pen upper body connected to a pen middle body. A curved touch screen display is attached to the pen upper body. A microcontroller is housed in the pen upper body and communicatively coupled to the curved touch screen display with a controller configured to determine where the curved touch screen display is touched. A dual mode Bluetooth circuit is housed in the pen upper body and communicatively coupled to the central processing unit and configured to send data to and receive data from the computer peripheral device. The central processing unit is connected to memory configured to load processing instructions for touching the curved touch screen display to select at least one executable icon to execute at least one software application.

7 Claims, 4 Drawing Sheets

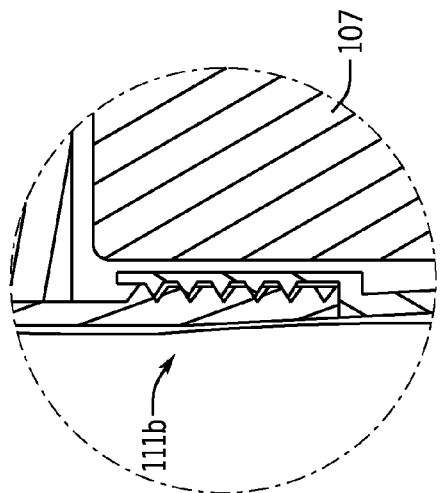
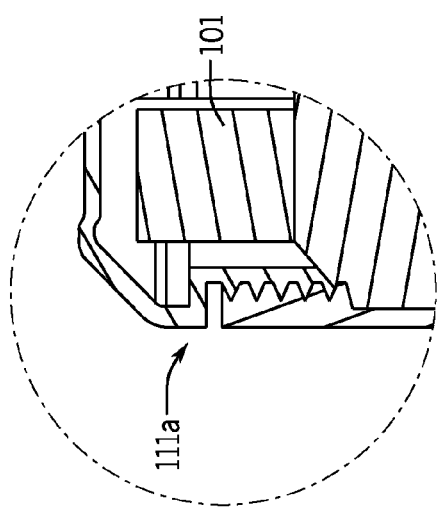
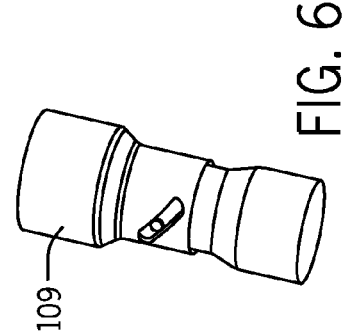
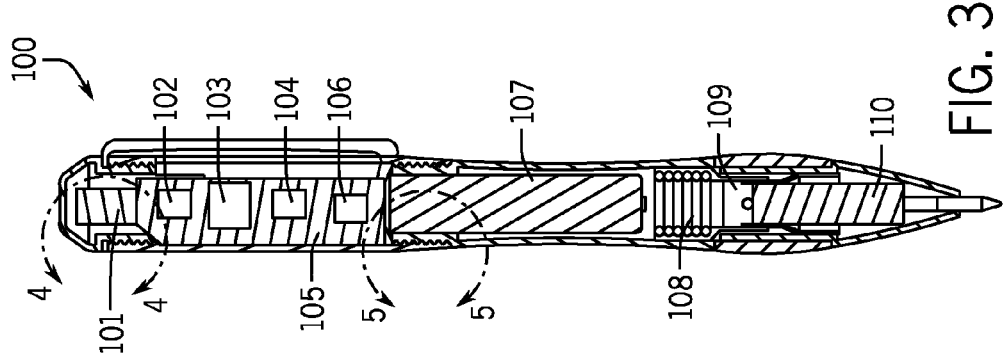

SMART PEN

BACKGROUND

The embodiments herein relate generally to personal electronic devices.

Prior to embodiments of the disclosed invention, during staff meetings or in classrooms, people were interrupted by calls and texts on their smartphones that are distracting and sometimes rude. Therefore, a discrete device that allows for seamless interaction to send and receive messages without distracting others was necessary. The prior art includes, U.S. Patent Application Publication 2013/0201162 filed by Cavilia; U.S. Pat. No. 7,231,181 issued to Kohli; and U.S. Pat. No. 6,956,564 issued to Williams.

Williams and Cavila both teach a smart pen with an LCD screen that is adjacent to touch or pressure switches but does not teach a touch screen. Kohli teaches a smart pen with a Bluetooth communicator, but it does not have a touchscreen or an accelerometer. Mechanically, putting either Williams or Cavila together with Kohli would be problematic because these references do not teach an effective power management solution. Embodiments of the disclosed invention solve these problems.

SUMMARY

A smart pen is configured to communicate with a computer peripheral device. The smart pen comprises an external assembly comprising a pen upper body connected to a pen middle body. A curved touch screen display is attached to the pen upper body. A microcontroller further comprising a central processing unit connected to memory is housed in the pen upper body and communicatively coupled to the curved touch screen display with a controller configured to determine where the curved touch screen display is touched. A nine-axis gyroscope and accelerometer circuit is housed in the pen upper body and communicatively coupled to the central processing unit. A dual mode Bluetooth circuit is housed in the pen upper body and is communicatively coupled to the central processing unit and configured to send data to and receive data from the computer peripheral device. An induction coil is connected to a power management unit wherein the induction coil is configured to charge a rechargeable battery. The central processing unit is connected to memory configured to load processing instructions for the following. First, touching the curved touch screen display selects at least one executable icon to execute at least one software application. Then, providing a data feed from the computer peripheral device to the curved touch screen display by programming the computer peripheral device to push the data feed to the curved touch screen display at a desired time interval.

In some embodiments, the processing instructions further comprise: notifying of an email on the computer peripheral device by pushing an icon to the curved touch screen display by pushing a notification signal from the computer peripheral device to the microcontroller.

In some embodiments, the processing instructions further comprise: rotating the pen upper body engages the nine-axis gyroscope and accelerometer circuit to reverse an arrangement of selector icons on the curved touch screen display. In some embodiments, the processing instructions further comprise: shaking the pen upper body returns the curved touch screen display to another menu.

In some embodiments, the processing instructions further comprise: configuring a motion in the computer peripheral device in order to equate the motion with a predetermined message. Then, creating the predetermined message by maneuvering the nine-axis gyroscope and accelerometer circuit equivalent to the motion. After that, pressing the curved touch screen display for sending the predetermined message from the computer peripheral device.

In some embodiments, the processing instructions further comprise: engaging air mouse functionality by selecting an air mouse application on the curved touch screen display. Then, displaying a right mouse button and a left mouse button on the curved touch screen display. After that, displaying a mouse icon on the computer peripheral device; and moving the mouse icon by maneuvering the nine-axis gyroscope and accelerometer circuit to maneuver the mouse icon; pressing a mouse button by pressing the curved touch screen display.

In some embodiments, the processing instructions further comprise: entering a presentation mode having slides shown on a display as directed by the computer peripheral device. Following that, creating a virtual laser pointer onto the display with an individualized icon. Then, moving the virtual laser pointer by maneuvering the pen upper body; and advancing slides on the display.

BRIEF DESCRIPTION OF THE FIGURES

The detailed description of some embodiments of the invention is made below with reference to the accompanying figures, wherein like numerals represent corresponding parts of the figures.

FIG. 3 is a longitudinal cross-sectional view.

FIG. 4 is a detail cross-sectional view indicated by line 4-4 of FIG. 3.

FIG. 5 is a detail cross-sectional view indicated by line 5-5 of FIG. 3.

FIG. 6 is a detail perspective view of the pen twist mechanism.

DETAILED DESCRIPTION OF CERTAIN EMBODIMENTS

Figure 1:
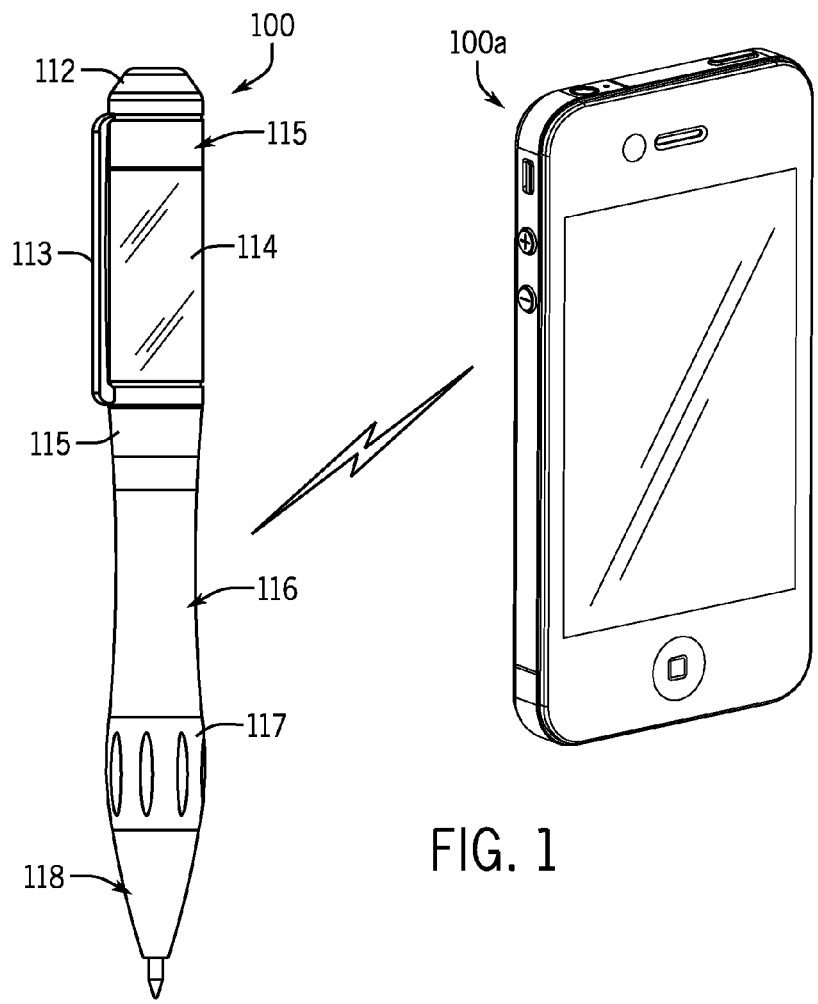
FIG. 1 is a side elevation view of an embodiment of the invention.

By way of example, and referring to FIG. 1, one embodiment of the present system comprises smart pen 100 which is communicatively coupled to computer peripheral device 250. Smart pen 100 further comprises external assembly 110 (shown) which is configured to cover at least some of internal assembly 130, which is shown in FIG. 3. External assembly 110 comprises pen cap 112 mechanically coupled to pen clip 114 and pen upper body 116. Pen upper body 116 is mechanically coupled to curved touch screen display 118 and pen middle body 120. Pen middle body 120 is mechanically coupled to pen grip 122. Pen grip 122 is mechanically coupled to pen lower body 124. Pen tip 126 extends through pen lower body 124 as shown in more detail in FIG. 3.

FIG. 3, FIG. 4, FIG. 5 and FIG. 6 shows internal assembly 130 in more detail. Pen cap 112 is mechanically coupled to pen cap threads 132. Pen upper body 114 is mechanically coupled to pen upper body cap threads 134. A user can remove pen cap 112 from pen upper body 114 by simply unscrewing pen cap threads 132 from pen upper body rap threads 134. Pen upper body 114 is further mechanically coupled to charging port 136 which is revealed by removing pen cap 112 from pen upper body 114. Pen upper body 114 houses circuit board 140 is attached to microcontroller 142, motion controller 144, Bluetooth circuit 146, power management unit 148, and audio circuit 170. Charging port 136 is electrically coupled to power management unit 148. Power management unit is further electrically coupled to rechargeable battery 150 with embedded induction coil 152 and a battery charger controller as shown in FIG. 7.

Pen upper body 114 is mechanically coupled to upper body middle threads 154. Pen middle body 116 is mechanically coupled to pen middle body threads 156. A user can remove pen upper body 114 from pen middle body 116 by simply upper body middle threads 154 from pen middle body threads 156. Pen middle body 116 is further mechanically coupled to embedded induction coil 152 which is revealed by removing pen upper body 114 and rechargeable battery 150.

Pen lower body 124 houses replaceable ink cartridge 158 which is partially controlled by pen twist assembly 160. Twisting pen grip 122 causes pen twist assembly 160 to push pen tip 126 to extend through pen lower body 124.

Figure 7:
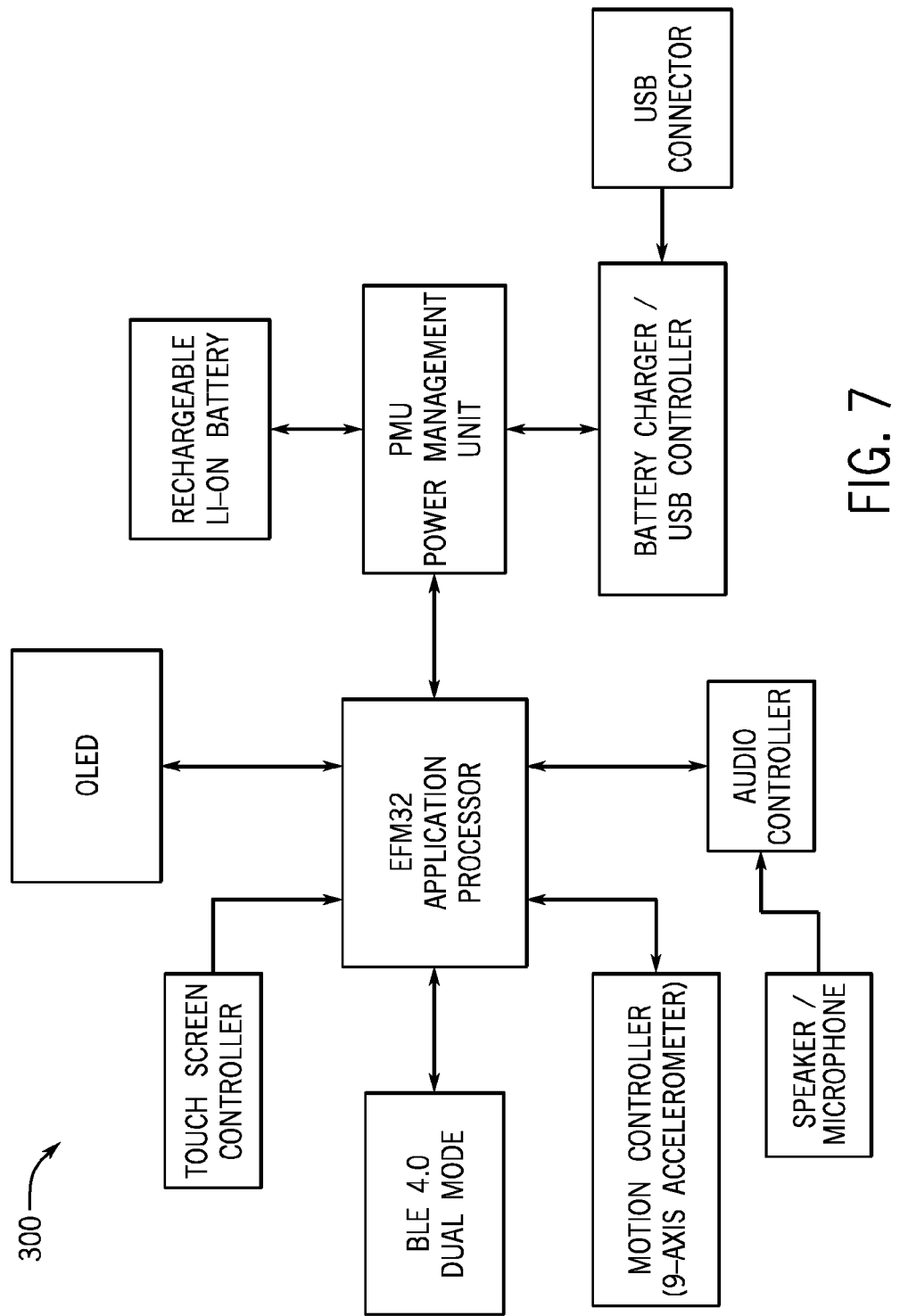
FIG. 7 is a flow chart.

FIG. 7 offers an embodiment of an arrangement of components on circuit board 140. In some embodiments, microcontroller 142 can be a Microchip PIC32MX™ 32-bit microcontroller or any other microcontroller having, a central processing unit (CPU), in addition with a fixed amount of memory (SRAM or Flash), read only memory (ROM), graphics interface, direct memory access (DMA) and perhaps other peripherals all embedded on a system on a chip (SoC). Microcontroller 142 is therefore programmed with processing instructions that are described in more detail below.

Those peripherals can include curved touch screen display 118. In some embodiments, curved touch screen display 118 can include a resistive, capacitive, surface acoustic wave, infrared grid, optical imaging and other technology. Resistive touch screens help users with larger fingers as they are more precise, however curved organic light emitting diode (OLED) capacitive touch screen display and curved E-ink capacitive touch screen display use much less electrical power and are preferred for that reason. In any case, curved touch screen display 118 is communicatively coupled to microcontroller 142 in order to communicate user selections to microcontroller 142.

Bluetooth circuit 146 can be configured to operate in a dual mode. The first mode can be Bluetooth 2.1 plus enhanced data rate (EDR). The headline feature of 2.1 is secure simple pairing (SSP): this improves the pairing experience for Bluetooth devices, while increasing the use and strength of security. EDR uses a combination of GFSK and Phase Shift Keying modulation (PSK) with two variants, π/4-DQPSK and 8DPSK. EDR can provide a lower power consumption through a reduced duty cycle and is preferable for that as one of the features of the smart pen is lower power consumption to preserve battery life.

The second mode can be Bluetooth Low Energy (BLE) 4.0. BLE 4.0 is a subset of Bluetooth v4.0 with an entirely new protocol stack for rapid build-up of simple links. As an alternative to the Bluetooth standard protocols that were introduced in Bluetooth v1.0 to v3.0, it is aimed at very low power applications running off a coin cell. Chip designs allow for two types of implementation, dual-mode, single-mode and enhanced past versions. In a dual-mode implementation, Bluetooth Smart functionality is integrated into an existing Classic Bluetooth controller. In this regard, Bluetooth circuit 146 is a dual mode Bluetooth circuit. Regardless of form, the dual mode operation simply searches for an incoming signal and then pulls data when a signal is found. The pull but not push strategy further reduces power consumption and increases battery life.

Power management unit 148 is configured to receive power from a battery charger which can be a universal service bus (USB) controller. Direct current power from the USB controller can either be used to charge rechargeable battery 150 or to power microcontroller 142 or any peripheral equipment. Likewise, rechargeable battery 150 can be used to power microcontroller 142 or any peripheral equipment.

Audio circuit 170 is configured to send and receive audio signals. Audio signals are sent through a speaker and received through a microphone. To avoid having the signals interfere with one another, an audio controller determines how microcontroller 142 processes audio signals.

Motion controller 144 can be a nine-axis accelerometer with a gyroscope circuit. In this regard, motion controller can detect the speed and direction of which smart pen 110 is moving. For instance, rotating pen upper body 116 engages the motion controller 144 to reverse an arrangement of selector icons on curved touch screen 118. Other data can be transmitted to microcontroller 142 to accomplish a variety of tasks as explained in FIG. 8.

Figure 8:
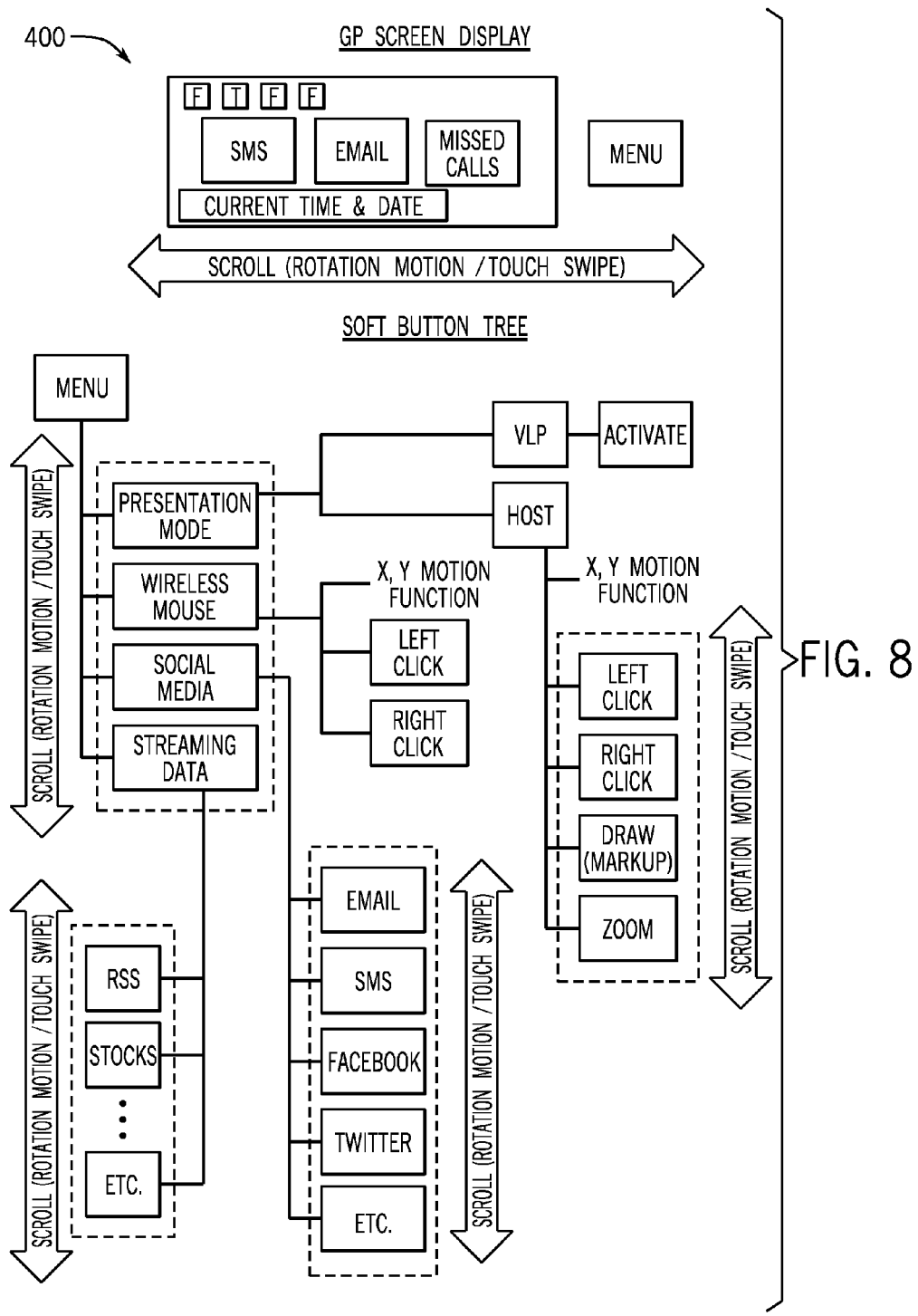
FIG. 8 is a schematic diagram.

Turning to FIG. 8, screen display 400 is shown as follows. A main screen comprises at least one executable icon and perhaps plurality of icons that are configured to engage at least one software application. These icons can be engaged by a notification signal when a short message service (SMS) message, an email or a missed call notification is received. The main screen further displays the current date and time and can display other icons as desired by the user. A user can view the SMS message, the header of the email or the number of the missed call by pressing the appropriate icon on curved touch screen display 118. A user can also navigate through a menu, however, shaking smart pen 100 can be read by motion controller 144 to return the user to the main screen.

The main screen can enable the user to enter into a menu. The menu has at least one mode. A first mode is presentation mode. Presentation mode requires that smart pen 100 be in sync with computer peripheral device 250. Presentation mode enables a virtual laser pointer to appear on computer peripheral device 250 and the menu changes to reflect the following options: left click, right click, draw (markup) and zoom. A user can press the corresponding icon on curved touch screen display 118. To result in the corresponding function on computer peripheral device 250. Smart pen 100 utilizes information from motion controller 144 to move the virtual laser pointer on a display on computer peripheral device 250. Further, left mouse button functionality can be used to advance slides. In some embodiments, it can be advantageous for a host to operate a first smart pen while showing an individualized icon on the screen of computer peripheral device 250. Another user can operate a second smart pen by showing a second individualized icon on the screen of computer peripheral device 250. In this regard, one can discern who is pointing at what. To exit presentation mode, a user simply shakes smart pen 100 to return to the main screen.

A second mode is wireless mouse mode that can be initiated by engaging air mouse functionality. Similar to presentation mode, here smart pen 100 engages air mouse functionality when a user selects an air mouse application on the menu. Then, displaying a right mouse button and a left mouse button on curved touch screen 118. After that, displaying a mouse icon on computer peripheral device 250. Following that, moving the mouse icon by maneuvering the nine-axis gyroscope and accelerometer circuit to maneuver the mouse icon. Finally, pressing a mouse button by pressing the curved touch screen.

A third mode is notification mode. The mode segregates data into a few select groups such as email, SMS, FACE- BOOK®, TWITTER® and so on. A user can view this data or notification, in the form that it exists on the computer peripheral device. One of the advantages of smart pen 100 is that it is able to make and send messages. For instance, when either an email or SMS notification is received on the smart pen 100, a pre-configurable reply application can be selected, the user can write out a short message with smart pen 100 and nine-axis gyroscope and accelerometer circuit will be able to discern letters and numbers that were previously loaded to create a message. In some embodiments, a few gestures can be taught to smart pen 100 in order to create a predetermined response message.

For instance, a user is in a meeting and receives a phone call causing an icon to engage on smart pen 100. The user waves smart pen 100 up left and down and the call is dropped, but the caller receives and SMS message indicating that the user will call back later.

A fourth mode is streaming data through a data feed such as really simple syndication (RSS), rather than have data pushed in chucks, data is constantly pushed to curved touch screen 118 when this mode is activated. This requires more battery power, so, by default, this is disabled, but can be configured to steam desired content provider. In either case, a signal can be read at a desired time interval, which can be selected by the user.

Figure 2:
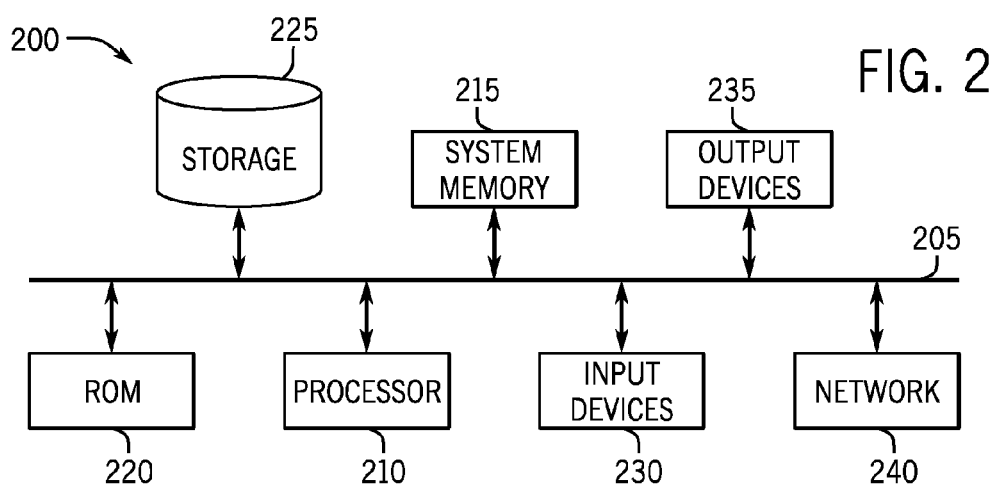
FIG. 2 is a block diagram.

FIG. 2 conceptually illustrates an electronic system 200 with which some embodiments of the invention are implemented. The electronic system 200 may be a computer, phone, PDA, or any other sort of electronic device. Such an electronic system includes various types of computer readable media and interfaces for various other types of computer readable media. Electronic system 200 includes a bus 205, processing unit(s) 210, a system memory 215, a read-only 220, a permanent storage device 225, input devices 230, output devices 235, and a network 240.

The bus 205 collectively represents all system, peripheral, and chipset buses that communicatively connect the numerous internal devices of the electronic system 200. For instance, the bus 205 communicatively connects the processing unit(s) 210 with the read-only 220, the system memory 215, and the permanent storage device 225.

From these various memory units, the processing unit(s) 210 retrieves instructions to execute and data to process in order to execute the processes of the invention. The processing unit(s) may be a single processor or a multi-core processor in different embodiments.

The read-only-memory (ROM) 220 stores static data and instructions that are needed by the processing unit(s) 210 and other modules of the electronic system. The permanent storage device 225, on the other hand, is a read-and-write memory device. This device is a non-volatile memory unit that stores instructions and data even when the electronic system 200 is off. Some embodiments of the invention use a mass-storage device (such as a magnetic or optical disk and its corresponding disk drive) as the permanent storage device 225.

Other embodiments use a removable storage device (such as a floppy disk or a flash drive) as the permanent storage device 225. Like the permanent storage device 225, the system memory 215 is a read-and-write memory device. However, unlike storage device 225, the system memory 215 is a volatile read-and-write memory, such as a random access memory. The system memory 215 stores some of the instructions and data that the processor needs at runtime. In some embodiments, the invention's processes are stored in the system memory 215, the permanent storage device 225, and/or the read-only 220. For example, the various memory units include instructions for processing appearance alterations of displayable characters in accordance with some embodiments. From these various memory units, the processing unit (s) 210 retrieves instructions to execute and data to process in order to execute the processes of some embodiments.

The bus 205 also connects to the input and output devices 230 and 235. The input devices enable the person to communicate information and select commands to the electronic system. The input devices 230 include alphanumeric keyboards and pointing devices (also called "cursor control devices"). The output devices 235 display images generated by the electronic system 200. The output devices 235 include printers and display devices, such as cathode ray tubes (CRT) or liquid crystal displays (LCD). Some embodiments include devices such as a touchscreen that functions as both input and output devices.

Finally, as shown in FIG. 2, bus 205 also couples electronic system 200 to a network 240 through a network adapter (not shown). In this manner, the computer can be a part of a network of computers (such as a local area network ("LAN"), a wide area network ("WAN"), or an intranet), or a network of networks (such as the Internet). Any or all components of electronic system 200 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A smart pen, configured to communicate with a computer peripheral device; the smart pen comprising:

an external assembly comprising a pen upper body connected to a pen middle body;
a curved touch screen display, attached to the pen upper body;
a microcontroller further comprising a central processing unit connected to memory, housed in the pen upper body and communicatively coupled to the curved touch screen display with a controller configured to determine where the curved touch screen display is touched;
a nine-axis gyroscope and accelerometer circuit, housed in the pen upper body and communicatively coupled to the central processing unit; and
a dual mode Bluetooth circuit, housed in the pen upper body, communicatively coupled to the central processing unit and configured to send data to and receive data from the computer peripheral device;
an induction coil, connected to a power management unit wherein the induction coil is configured to charge a rechargeable battery;
wherein the central processing unit is connected to memory configured to load processing instructions for the following:
  touching the curved touch screen display selects at least one executable icon to execute at least one software application; and
  providing a data feed from the computer peripheral device to the curved touch screen display by programming the computer peripheral device to push the data feed to the curved touch screen display at a desired time interval.

2. The smart pen of claim 1, wherein the processing instructions further comprise: notifying of an email on the computer peripheral device by pushing an icon to the curved touch screen display by pushing a notification signal from the computer peripheral device to the microcontroller.

3. The smart pen of claim 1, wherein the processing instructions further comprise: rotating the pen upper body engages the nine-axis gyroscope and accelerometer circuit to reverse an arrangement of selector icons on the curved touch screen display.

4. The smart pen of claim 1, wherein the processing instructions further comprise: shaking the pen upper body returns the curved touch screen display to another menu.

5. The smart pen of claim 1, wherein the processing instructions further comprise: configuring a motion in the computer peripheral device in order to equate the motion with a predetermined message; creating the predetermined message by maneuvering the nine-axis gyroscope and accelerometer circuit equivalent to the motion; and pressing the curved touch screen display for sending the predetermined message from the computer peripheral device.

6. The smart pen of claim 1, wherein the processing instructions further comprise: engaging air mouse functionality by selecting an air mouse application on the curved touch screen display; displaying a right mouse button and a left mouse button on the curved touch screen display; displaying a mouse icon on the computer peripheral device; and moving the mouse icon by maneuvering the nine-axis gyroscope and accelerometer circuit to maneuver the mouse icon; pressing a mouse button by pressing the curved touch screen display.

7. The smart pen of claim 1, wherein the processing instructions further comprise: entering a presentation mode having slides shown on a display as directed by the computer peripheral device; creating a virtual laser pointer onto the display with an individualized icon; moving the virtual laser pointer by maneuvering the pen upper body; and advancing slides on the display.

* * * * *